(12) United States Patent
Abbasi et al.

(10) Patent No.: US 8,967,298 B2
(45) Date of Patent: Mar. 3, 2015

(54) TRANSMISSION OF LIGHT THROUGH LIGHT ABSORBING MEDIUM

(75) Inventors: Hamid Ali Abbasi, Naperville, IL (US); Colin John Hawthorn, Des Plaines, IL (US); Mark Kleefisch, Plainfield, IL (US)

(73) Assignee: Gas Technology Institute, Des Plaines, IL (US)

( * ) Notice: Subject to any disclaimer, the term of this patent is extended or adjusted under 35 U.S.C. 154(b) by 901 days.

(21) Appl. No.: 12/711,384

(22) Filed: Feb. 24, 2010

(65) Prior Publication Data

US 2011/0205652 A1    Aug. 25, 2011

(51) Int. Cl.
*E21B 21/00*    (2006.01)
*E21B 7/14*    (2006.01)
*G02B 6/10*    (2006.01)

(52) U.S. Cl.
CPC .... *E21B 7/14* (2013.01); *G02B 6/10* (2013.01)
USPC ................ 175/65; 385/125; 359/509; 175/11

(58) Field of Classification Search
CPC ............. E21B 7/14; E21B 7/15; E21B 29/02; E21B 10/60; B23K 26/38; B23K 26/026; B23K 26/14; B23K 26/1417; G02B 26/004; G02B 26/08; G02B 6/3538; H01P 3/20
USPC ........... 166/57, 256, 376; 175/12, 16, 65, 69, 175/71, 11; 219/121.65–121.67, 121.7, 219/121.72, 121.79, 121.84; 299/3, 14; 359/358, 507, 509, 665–667, 894, 896, 359/614; 385/38, 125; 398/142
See application file for complete search history.

(56) References Cited

U.S. PATENT DOCUMENTS

| | | | |
|---|---|---|---|
| 3,410,628 A * | 11/1968 | Conklin | 359/655 |
| 3,871,485 A | 3/1975 | Keenan, Jr. | |
| 3,894,788 A | 7/1975 | Gambling et al. | |
| 4,066,138 A | 1/1978 | Salisbury et al. | |
| 4,090,572 A | 5/1978 | Welch | |
| 4,113,036 A | 9/1978 | Stout | |
| 5,107,936 A | 4/1992 | Foppe | |
| 5,517,024 A | 5/1996 | Mullins et al. | |
| 5,570,447 A | 10/1996 | Liu | |
| 5,805,754 A * | 9/1998 | Zhang | 385/125 |
| 5,948,292 A | 9/1999 | Tanaka et al. | |
| 6,545,247 B2 * | 4/2003 | Mukasa et al. | 219/121.63 |
| 6,888,097 B2 | 5/2005 | Batarseh | |
| 6,982,997 B1 | 1/2006 | Jiang et al. | |
| 7,490,664 B2 | 2/2009 | Skinner et al. | |

(Continued)

FOREIGN PATENT DOCUMENTS

WO    WO 2006117935 A1 * 11/2006
WO         2008085675         7/2008

*Primary Examiner* — Stephone B Allen
*Assistant Examiner* — James McGee
(74) *Attorney, Agent, or Firm* — Pauley Petersen & Erickson

(57) ABSTRACT

A method and apparatus for transmitting light through a light absorbing medium in which a light transmissive fluid column or channel contiguous with the light absorbing medium is formed in the light absorbing medium. The light is introduced into a light inlet end of the column of light transmissive fluid, whereby the light is transmitted in the column of light transmissive fluid through the light absorbing medium until exiting a light outlet end of the column. The invention has applicability to the field of fiber optics and downhole applications of lasers, such as for wellbore drilling and completion activities.

17 Claims, 9 Drawing Sheets

(56) References Cited

U.S. PATENT DOCUMENTS

| | | |
|---|---|---|
| 8,424,617 B2 * | 4/2013 | Faircloth et al. ............... 175/16 |
| 2004/0099643 A1 * | 5/2004 | Fabbro et al. ............ 219/121.63 |
| 2007/0158320 A1 | 7/2007 | Kuo et al. |
| 2008/0166132 A1 * | 7/2008 | Lynde et al. .................. 398/142 |
| 2009/0056434 A1 | 3/2009 | Csutak |
| 2009/0084765 A1 * | 4/2009 | Muratsubaki et al. ... 219/121.67 |
| 2009/0126235 A1 | 5/2009 | Kobayashi et al. |
| 2010/0044103 A1 * | 2/2010 | Moxley et al. .................. 175/16 |

* cited by examiner

TRANSMISSION OF LIGHT THROUGH LIGHT ABSORBING MEDIUM

BACKGROUND OF THE INVENTION

1. Field of the Invention

This invention relates to a method and apparatus for transmitting light energy through a light energy absorbing medium. In one aspect, this invention relates to the transmission of laser energy through a light energy absorbing medium. In another aspect, this invention relates to the transmission of laser energy through a light energy absorbing material to a target area in a subterranean wellbore.

2. Description of Related Art

It is well known that substantial, heretofore untapped reserves of fossil fuels, including oil and natural gas, are buried deep within the ground. Access to these reserves may be obtained by means of wellbores that are produced by drilling apparatuses, which generally employ drill bits having hard and durable cutting contact elements. However, frequently these reserves are disposed beneath hard geological formations, e.g. rocks, which may even be impenetrable using conventional drilling equipment. Drilling of such hard formations requires a substantial amount of time and generally results in high costs. In addition, the drill bits used to drill through these hard formations are subject to extensive wear and/or damage. Thus, impenetrable formations may require the use of overly complex drilling routes in order to circumvent the formations and, in some cases, may result in complete abandonment of the drilling operation.

In addition to hard geological formations, unstable formations, e.g. shale, are frequently encountered, which formations may cause damage to and/or loss of drilling equipment. Unstable formations may also cause entrapment and subsequent abandonment of the drilling equipment.

One solution to the problems associated with the use of conventional drilling equipment, which as previously stated employ drill bits comprising one or more mechanical cutting elements, has been to use laser beams as a means of boring wells into the earth. For example, U.S. Pat. No. 4,066,138 to Salisbury et al. teaches an earth boring apparatus mounted above ground that directs an annulus of high powered laser energy downwardly for boring a cylindrical hole by fusing successive annular regions of the stratum to be penetrated at a power level that shatters and self-ejects successive cores from the hole. U.S. Pat. No. 4,113,036 to Stout teaches a laser drilling method and system of fossil fuel recovery in which a vertical bore hole is drilled into an underground formation, a laser beam is projected through the vertical borehole and reflected horizontally from the hole through the formation along a matrix of bores. U.S. Pat. No. 3,871,485 to Keenan, Jr. teaches a method of drilling using a laser beam in which a laser beam generator that is electrically connected to an inhole voltage generator actuated by drilling mud or other liquid passing through a laser beam housing connected to the drill string is positioned in the wellhole and a reflecting crystal is positioned within the laser beam housing to reflect the beam in an elliptical pattern across the formation to be penetrated. U.S. Pat. No. 5,107,936 to Foppe teaches a heat drilling process employing laser beams as a heat source in which the profile of the borehole is melted down by the heat source and the resulting molten rock is pressed into the surrounding side rock during the drilling process such that only a gap defining the outer profile of the borehole is melted down, which surrounds a drill core, which is extracted at an adjustable distance behind the melting zone.

It will be appreciated that the downhole environment of a wellbore during the drilling process as well as during other activities typically utilizing drilling, such as wellbore completion, the process of perforating the wellbore wall to initiate or enhance fluid flow into the wellbore, is extremely harsh, what with high temperatures and pressures, wellbore fluids, and debris generated during the drilling operation, and that such an environment presents substantial challenges to the effective use of lasers for drilling. One of the problems associated with the use of lasers in subterranean wellbores is the undesirable dissipation of the laser energy due to the debris and other environmental impediments encountered downhole. U.S. Pat. No. 6,888,097 to Batarseh teaches the use of a plurality of nozzles disposed around a laser head assembly which provide a purging gas for the purpose of removing dust or other particles from the exterior surface of transparent housing of the assembly. Suitable purging fluids may be gas, such as high pressure air, or liquids. Also taught therein is the use of at least a portion of the nozzles as vacuum nozzles connected to a vacuum source and adapted to remove gaseous fluids from around the exterior of transparent housing. While suitable for use in addressing the removal of dust and other particles, the apparatus does nothing to address the dissipation of laser energy resulting from the presence of fluids which may be present downhole, such as dirty water, drilling muds, and other wellbore fluids. Thus, there is a need for a method and apparatus by which the dissipation of laser energy in the downhole environment may be substantially reduced.

U.S. Pat. No. 4,090,572 to Welch teaches a method and apparatus for laser treatment of geological formations in which a laser beam is projected into a wellbore along a tubular beam guide so as to provide sufficient laser energy to melt or vaporize the formations under down-hole conditions. In this way, the laser beam is isolated from the surrounding fluids by a solid tubular beam guide, albeit at the expense of an additional amount of downhole equipment. U.S. Pat. No. 5,570,447 to Liu teaches the use of water or other aqueous liquid disposed in a rigid capillary or other suitably shaped inflexible vessel as a light conducting core medium of an elongated, small diameter vessel employed for light transmission suitable for spectrometry, photometry, and fluorimetry. See also U.S. Pat. No. 3,894,788, which teaches a liquid-core fiber-optic waveguide comprising a hollow vitreous fiber filled with a liquid having a refractive index greater than that of the vitreous fiber. It will be appreciated that in each instance of light transmission in accordance with the teachings of the prior art the light beam is isolated from the surrounding environment by some form of containment vessel. It will also be appreciated that the space available for downhole operations is limited, making it desirable to limit the amount of additional equipment employed to address the problem of laser energy dissipation.

SUMMARY OF THE INVENTION

Accordingly, the invention disclosed herein is a method for transmitting light through a light absorbing medium which avoids the use of a rigid tubular or other light containment vessel. In the disclosed method, a light transmissive fluid is introduced into the light absorbing medium, forming a unitary or multi-component column of the light transmissive fluid through, and contiguous with, the light absorbing medium. As used herein, the term "contiguous" refers to a direct contact between the light transmissive fluid and the surrounding light absorbing medium. The light is introduced into a light inlet end of the column of light transmissive fluid, whereby the light is transmitted in the column of light transmissive fluid through the light absorbing medium until exiting a light outlet end of the column. While not limited in its utility, the invention has applicability to the field of fiber optics and downhole applications of lasers, such as for wellbore drilling and completion activities. In addition to enabling the transmission of light energy, such as laser energy, through a light energy absorbing fluid or medium, the method of this invention also enables the removal of any debris that is generated upon impact of the light energy on a workpiece. In certain applications, the method of this invention also allows for the use of gases such as oxygen to assist with certain operations, such as cutting metals or steel with lasers in the presence of combustibles while reducing the potential for fire and explosions. Furthermore, this invention also allows for the creation of a controlled dimensioned (uniform diameter, reducing diameter, or increasing diameter) clear, substantially coherent channel of a gaseous fluid through a light absorbing fluid and, in particular, the creation of this channel to clear a longer path through the light absorbing fluid, especially liquid, compared with a single jet of gas. This is of substantial benefit in high power remote welding and cutting applications, defined as any application requiring a mechanism to actively steer the beam and direct it to various target locations at dissimilar distances from the steering mechanism.

BRIEF DESCRIPTION OF THE DRAWINGS

These and other features of this invention will be better appreciated from the following detailed description taken in conjunction with the drawings, wherein.

DETAILED DESCRIPTION OF THE PRESENTLY PREFERRED EMBODIMENTS

Figure 1:
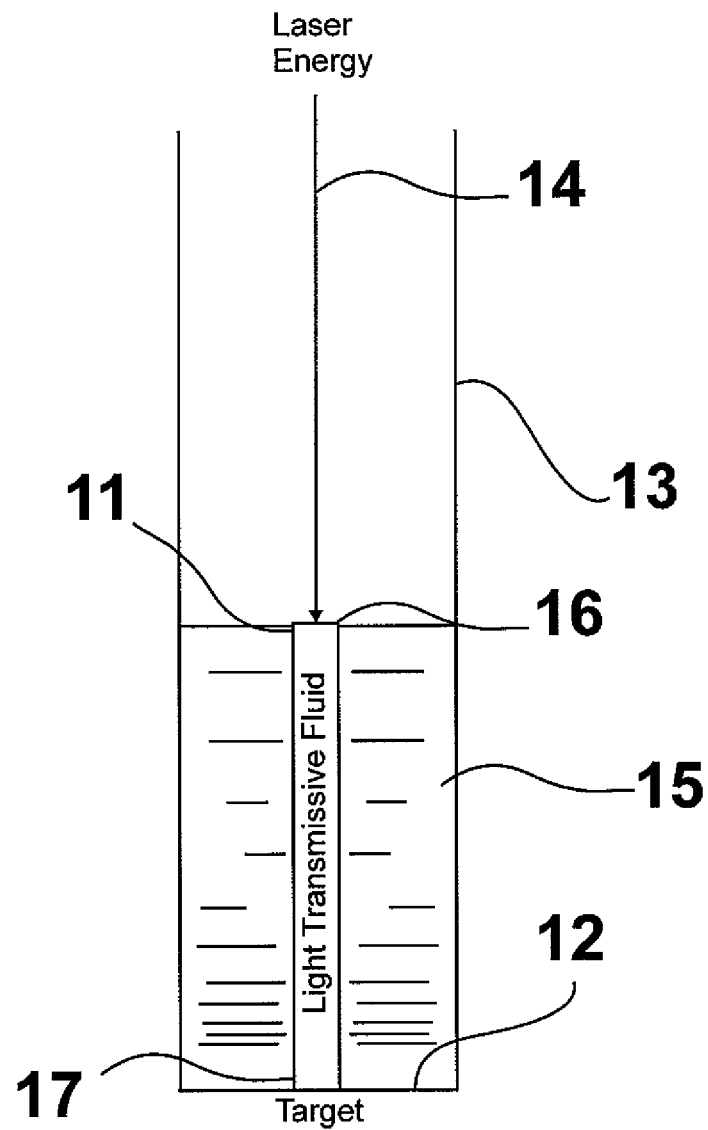
FIG. 1 is a diagram showing the invention in its simplest form, namely a channel or column comprising a cylindrical stream of a single clear, i.e. light transmissive, fluid passing through a light absorbing fluid.

The basic concept of this invention is illustrated in FIG. 1, which shows a single coherent column or channel 11 of a light transmissive fluid disposed in, and contiguous with, a light absorbing medium 15 disposed in a wellbore 13, and having a light inlet end 16 through which laser energy or light 14 is introduced into the channel or column and having a light outlet end 17 proximate a target 12 to which the laser energy is applied for drilling, cutting and other material laser energy induced operations. As used herein, the term "light transmissive fluid" refers to a fluid having greater light transmissivity than the light absorbing medium. The light transmissive fluid may be any liquid or gas through which light is transmittable. In accordance with one particularly preferred embodiment of this invention, the light transmissive fluid is a fluid such as water, an organic fluid, such as a halocarbon, or aqueous or organic solution that is substantially transparent to light. In accordance with one embodiment, the light transmissive fluid is a fluid which may be used to assist in the downhole operations. One such fluid is oxygen which may facilitate certain downhole operations such as cutting metals or steel with the laser in the presence of a combustible material, while reducing the potential for fire and explosion.

It will be apparent to those skilled in the art that, given the contiguous relationship between the column of light transmissive fluid and the light absorbing medium, there exists the potential for incursion of the light absorbing medium into the column of light transmissive fluid, thereby reducing the transmission of light through the light absorbing medium. To minimize mixing and contamination of the light transmissive fluid with the surrounding light absorbing medium, at least the boundary region of the light transmissive fluid column is maintained in a laminar flow regime. The velocity of the light transmissive fluid required to maintain the laminar flow regime depends on actual conditions, such as turbulence, viscosity, thickness, and density of the light absorbing medium and the viscosity, equivalent diameter (using the actual cross-sectional area and calculating the diameter assuming that the cross-section is substantially circular), and density of the light transmissive fluid, and are readily determinable by one versed in the art using conventional principles of fluid mechanics. In many instances, it will be necessary to generate a high velocity jet of the light transmissive fluid to uniformly penetrate the light absorbing medium.

Figure 2:
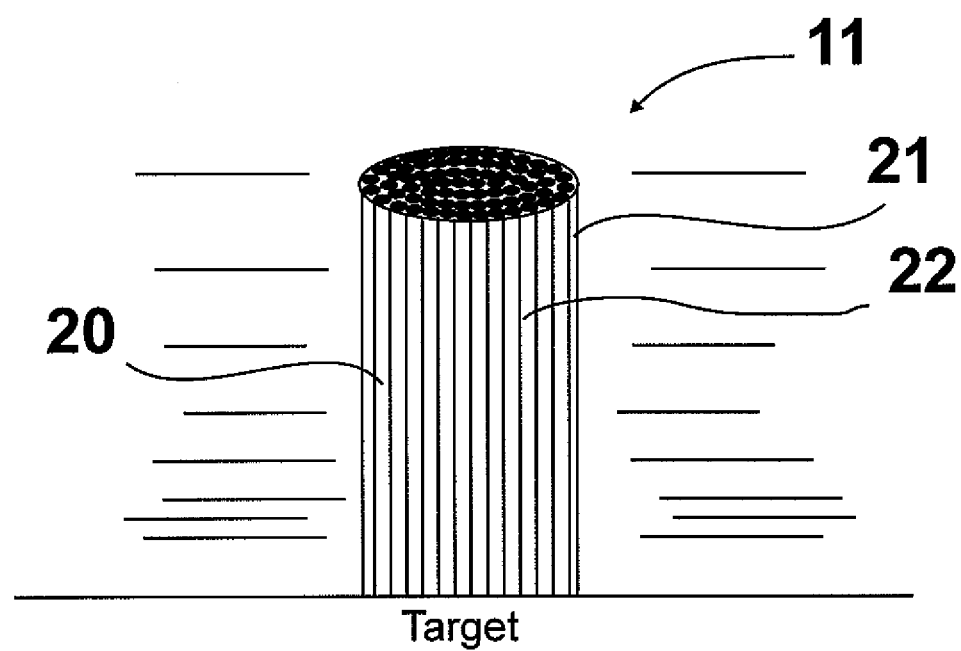
FIG. 2 is a diagram showing the channel of light transmissive fluid formed by a plurality of smaller equivalent diameter streams in accordance with one embodiment of this invention.

In one embodiment employing principles of microfluidics, which is the study of behavior, precise control and manipulation of fluids that are geometrically constrained to very small, typically sub-millimeter scale, the high velocity laminar flow channel of light transmissive fluid is formed by a plurality of parallel, closely packed, high velocity, small equivalent diameter jets or streams 20, 21, 22 as shown in FIG. 2, preferably having substantially uniform velocities across the cross-section of the high velocity laminar flow channel. In accordance with one embodiment of this invention, the diameter of the small equivalent diameter jets or streams is less than or equal to about 1 μm. In accordance with one embodiment, the Reynolds numbers of the small equivalent diameter streams are below the laminar flow limit for the downhole environment of the wellbore, typically less than about 2300, and preferably in the range of about 50 to about 500.

Figure 3:
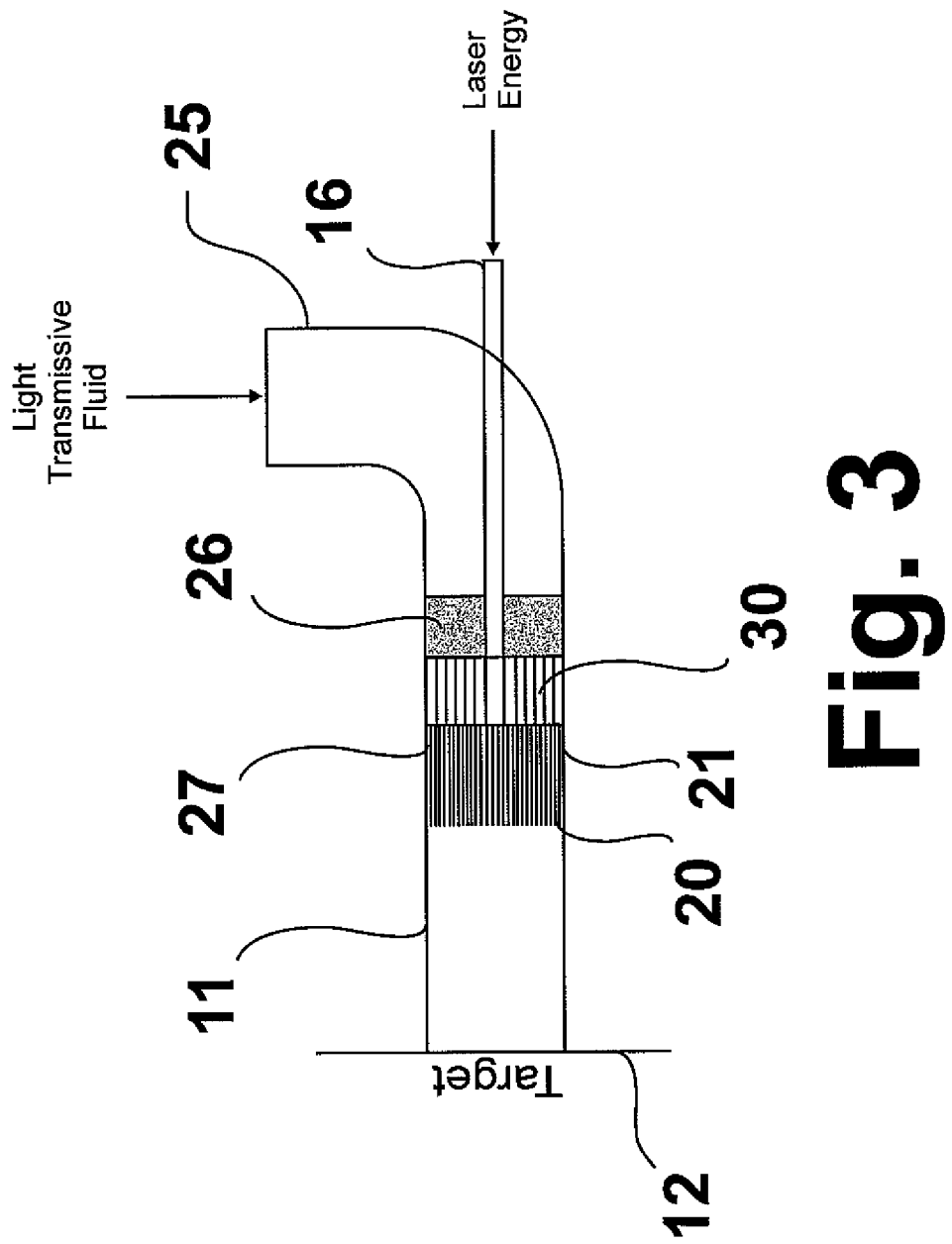
FIG. 3 is a diagram showing a device for forming the multi-stream channel of light transmissive fluid of FIG. 2 in accordance with one embodiment of this invention.

Creation of the plurality of parallel, closely packed, high velocity, small equivalent diameter jets or streams may be accomplished using any of a number of techniques known to those versed in the art to flatten the flow rate profile across the cross-section of the high velocity laminar flow channel formed by the plurality of small streams and to break the channel up into tiny streams. FIG. 3 shows an exemplary device for producing the tiny streams in which a light transmissive fluid flowing through a flow distribution conduit 25 is substantially evenly distributed across the radial cross-section of the conduit by means of a flow distributor 26 disposed proximate the light inlet end 27 of the light transmissive fluid channel. Suitable flow distribution means for use in the method of this invention include a honeycomb structure, steel wool, micro, or nano porous packing, or a perforated plate, all having uniform small, micro or nano equivalent diameter openings across the radial cross-section. Disposed downstream of the flow distribution means are a plurality of tiny parallel tubes 30 packed together through which the light transmissive fluid 11 may be transported, resulting in the formation of a plurality of tiny laminar streams 20, 21. The tubes may have a straight profile or, as shown in FIGS. 11-14 may have a curved profile whereby the direction of fluid flow may be changed from, for example, a substantially radial flow to a substantially vertical flow. It will be appreciated that other means of generating the tiny channels are known, such as the microchannels available from Cooligy, Inc. in Mountain View, Calif.

Although there may be other light absorbing media in a wellbore, the primary light absorbing medium of concern is the drilling fluid, referred to as mud. As provided to the downhole region of the wellbore, the drilling fluid, when flowing, typically has a velocity in the range of about 1 to about 5 ft/sec. When employing a light transmissive fluid of substantially similar density and viscosity as the light absorbing fluid, the velocity of the light transmissive fluid producing a solid coherent stream (FIGS. 1, 2, 3, 5, 6, 9, and 11) or surrounding the light transmissive channel thereby producing hollow streams (FIGS. 4, 7, 8, 10, and 12) should be in the range of about 1 to about 100 times the velocity of the drilling fluid velocity, and preferably in the range of about 2 to about 20 times the drilling fluid velocity. The lower end of this velocity (1 to 100 ft/s, and preferably between 2 to about 20 ft/s) is suitable for use when the light absorbing medium is static.

Figure 4:
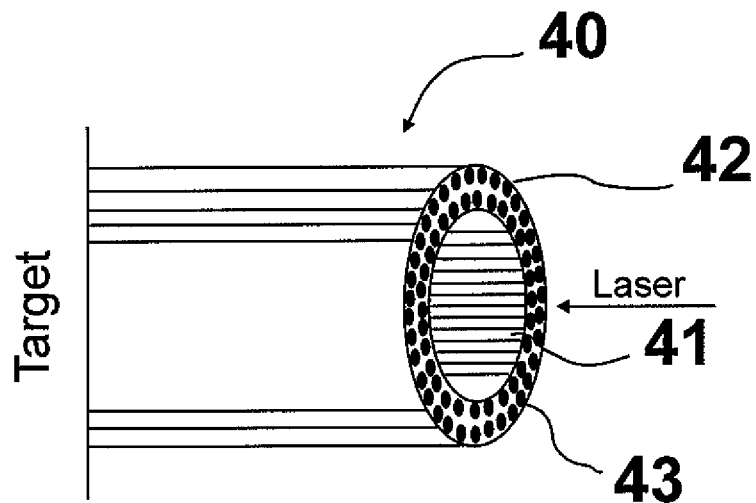
FIG. 4 is a diagram showing a hollow cylindrical stream of light transmissive fluid having an inner stream of light transmissive fluid for transmission of light energy in accordance with one embodiment of this invention.

In accordance with one embodiment of this invention as illustrated in FIG. 4, the light transmissive fluid channel 40 comprises an inner light transmissive fluid stream 41 disposed within a peripheral annular ring 42 formed by a plurality of small, equivalent diameter streams 43. In this case, the laser energy is transmitted through the inner light transmissive fluid stream 41. To maximize the transmission of light, refractive indexes of the inner light transmission channel may be chosen to be higher than the surrounding fluid forming the plurality of small, equivalent diameter streams 43, thereby establishing an optical waveguide. The refractive indexes may be controlled and adjusted through the selection of proper channel fluids or by the use of additives such as potassium chloride or water.

Figure 5:
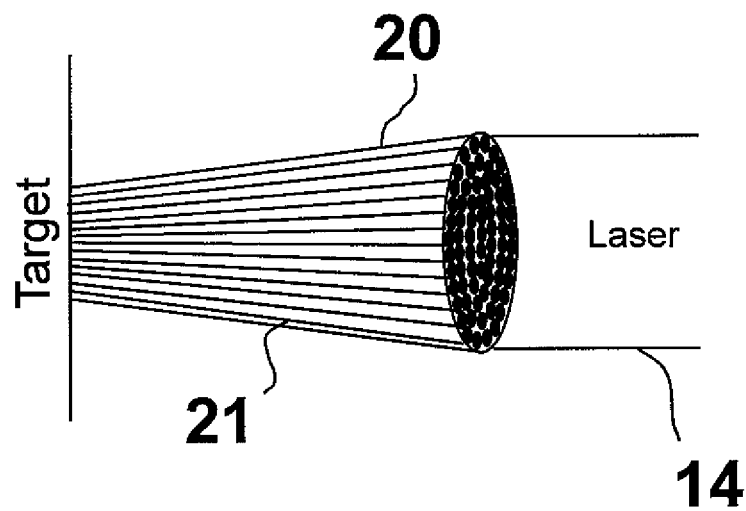
FIG. 5 is a diagram showing the use of a tapered flow channel as a means for decreasing the diameter of the light energy beam within the fluid absorbing medium in accordance with one embodiment of this invention.
Figure 6:
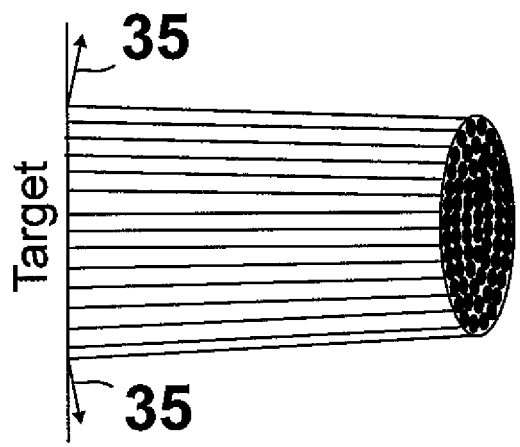
FIG. 6 is a diagram showing the use of a tapered flow channel as a means for expanding the diameter of the light energy beam within the fluid absorbing medium in accordance with one embodiment of this invention.
Figure 7:
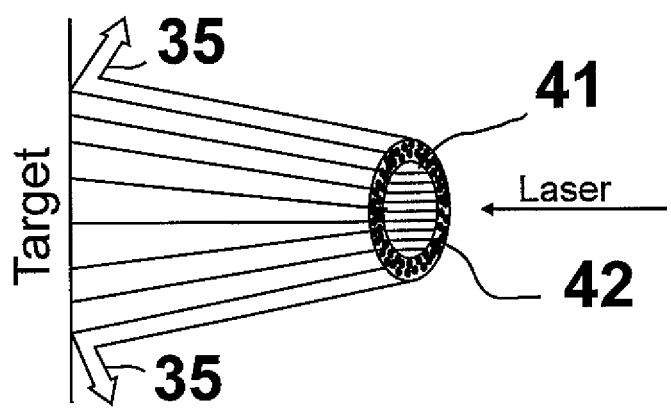
FIG. 7 is a diagram showing a diverging hollow stream of light transmissive fluid in accordance with one embodiment of this invention.

In addition to providing a clear path for transmission of laser energy through a light absorbing medium, the method of this invention may also be employed as a means for controlling the size of the interface between the laser light and the target area, depending upon the activity being performed. In accordance with one embodiment, the channel of light transmissive fluid is tapered in a direction of light energy transmission, thereby reducing the diameter of the light energy beam and focusing the beam on the target area as shown in FIG. 5. In accordance with one embodiment, the channel of light transmissive fluid is tapered against the direction of light energy transmission to increase the diameter of the energy beam, spreading the coverage of the target area by the light energy as shown in FIG. 6. A further benefit of this embodiment may be realized due to the orientation of the light transmissive fluid which provides flow of the light transmissive fluid substantially in a radial direction to the light beam axis as indicated by arrows 35 shown in FIGS. 6 and 7, when the light transmissive fluid impacts a solid surface. This approach is especially useful for removing debris created by the light energy, for example, when used in heating, joining, melting, vaporizing, cutting, spalling, or perforating metal, rock, or other materials.

Figure 8:
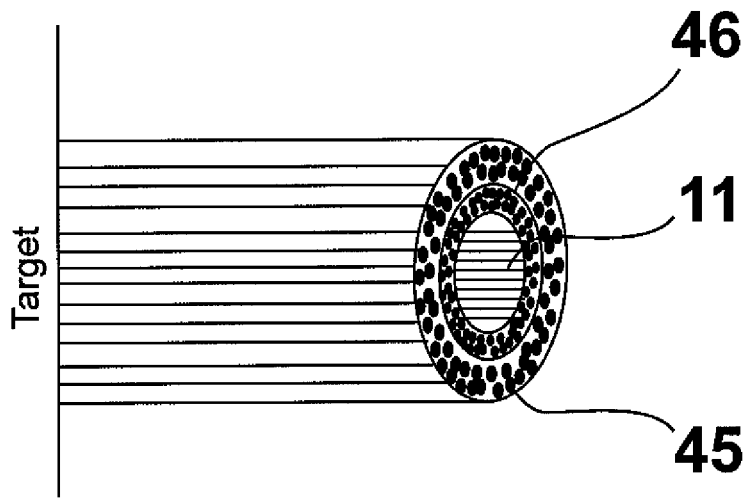
FIG. 8 is a diagram showing concentric coherent streams disposed around a center channel in accordance with one embodiment of this invention.
Figure 9:
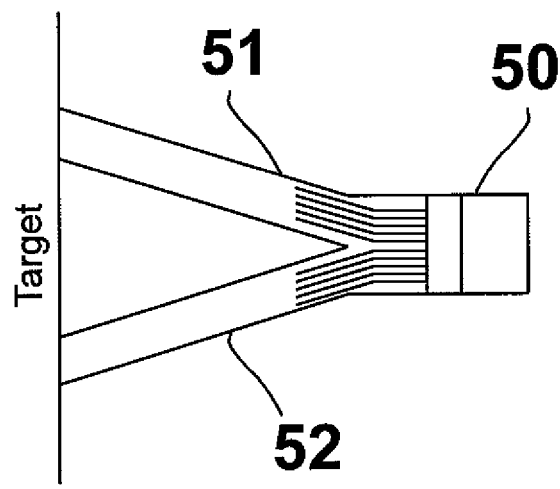
FIG. 9 is a diagram showing the use of a splitter providing multiple channels of light transmissive fluid for channeling the light energy through multiple channels in accordance with one embodiment of this invention.

In one embodiment as illustrated in FIG. 8, two or more layers or rings of streams 45, 46 of similar or different fluids may be employed around the periphery of the light transmissive fluid channel 11, thereby forming an inner channel of light transmissive fluid, to minimize contamination thereof. In accordance with another embodiment of this invention as shown in FIG. 9, a plurality of channels of light transmissive fluid are created using a splitter device 50 to channel the light energy through multiple channels 51, 52.

In accordance with one embodiment, the method of this invention is used in a wellbore to transmit laser energy for cutting, heating, vaporizing, melting, spalling, and/or perforating wellbore material such as metal casings and/or rock formations. By using a light transmissive fluid with lower heat transfer properties, such as a gas, the effect of energy transmission on the particular operation may be further enhanced by virtue of the removal of less heat by the light transmissive fluid. In accordance with one embodiment of this invention, the inner channel of light transmissive fluid is selected from a group that assists with the particular process being employed in the wellbore, for example, an oxygen-containing fluid such as air, oxygen-enriched air or oxygen, when cutting metal such as steel. The annular fluid streams help to control the temperature rise and mixing of the oxygen with combustible fluids which may be present. In accordance with one embodiment of this invention, additives to the annular fluid streams may be employed to retard any combustion potential. For example, a chemical may be added which reacts with the oxygen to form an inert compound, thereby preventing the mixing of free oxygen with surrounding combustibles.

The method of this invention is especially useful in applying laser energy in downhole operations, where these operations must be performed in wells filled with light absorbing fluids. This invention also enables the creation of a controlled dimensioned channel of the light transmissive fluid, especially a gaseous fluid. The dimensions of the gas channel may be controlled by the internal dimensions of the inner channel. Without the outer annular streams, the inner light transmissive gaseous fluid channel would typically expand at about 22 degree angle, making it less effective for deep penetrations through heavy fluids. This invention allows the transmission of light energy through a light transmissive gas channel across absorbing liquid or vitiated gases by maintaining the shape of the inner light transmissive fluid channel for substantial distances that are significantly longer than would be achieved without the peripheral annular streams. Without the high velocity peripheral laminar flow annular streams of liquid, the gas jet would expand and not be able to penetrate a thick layer of light absorbing fluid, especially if the light absorbing fluid is a liquid.

Figure 10:
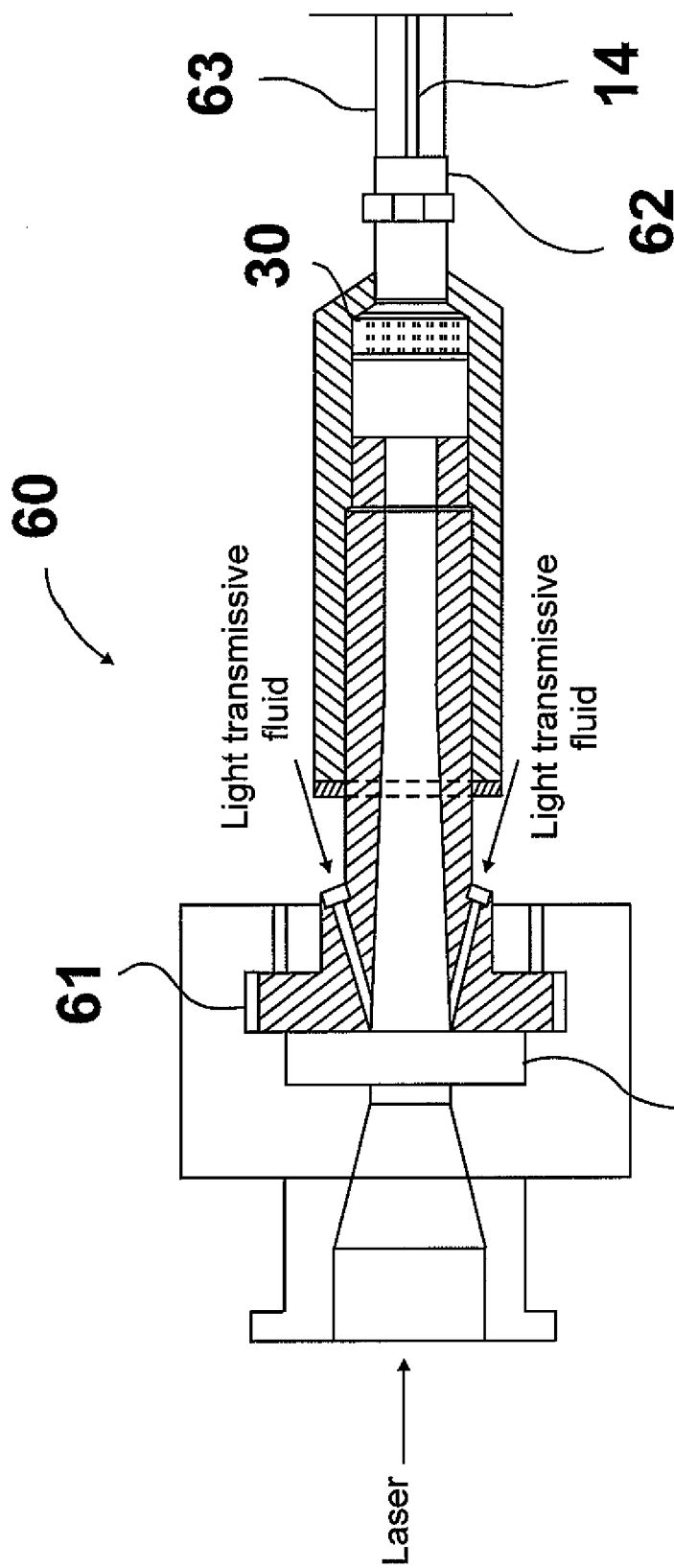
FIG. 10 is a diagram showing an apparatus suitable for use in the method of this invention.
Figure 11:
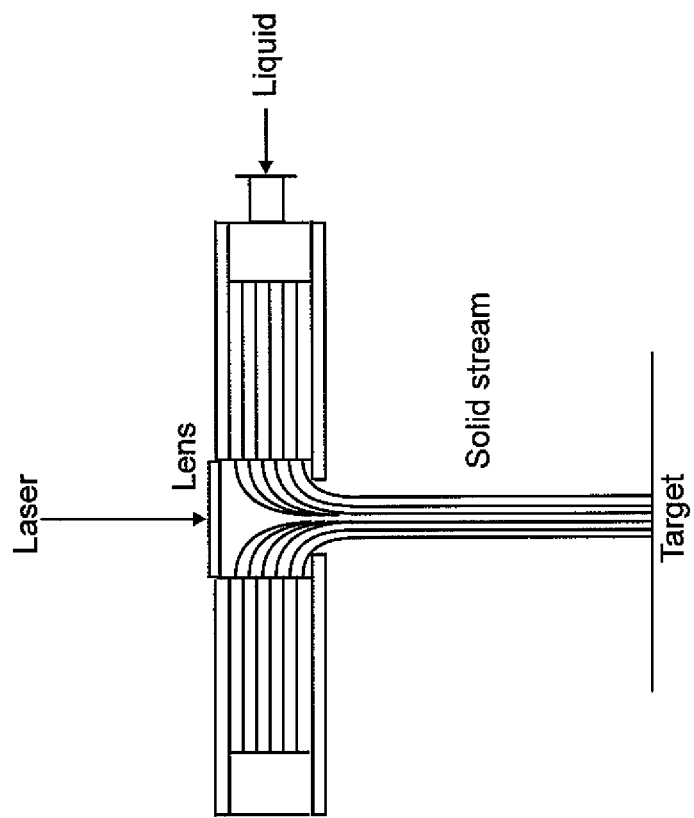
FIG. 11 is a diagram showing the use of a plurality of radial streams of a light transmissive fluid converging to form a single coherent stream in accordance with one embodiment of this invention.
Figure 12:
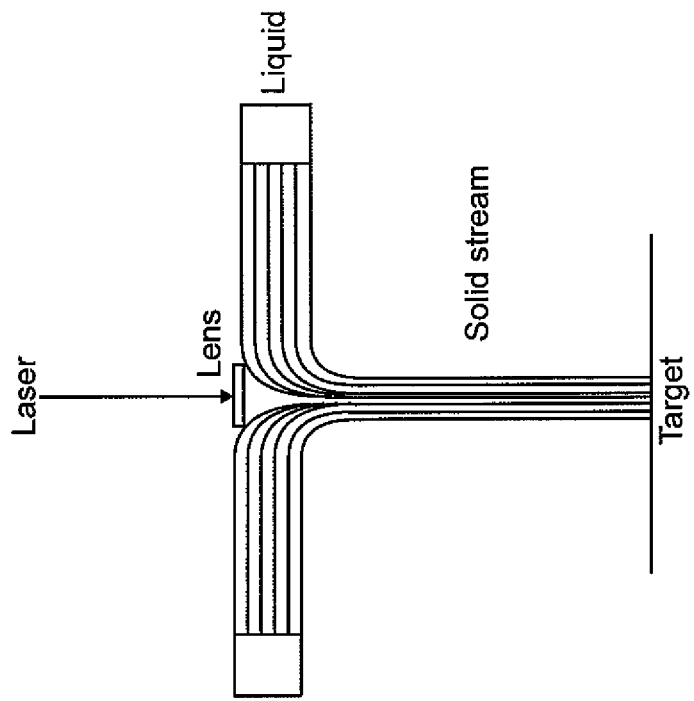
FIG. 12 is a diagram showing the use of a plurality of radial streams in combination with a gaseous fluid to produce a solid stream in accordance with one embodiment of this invention.
Figure 13:
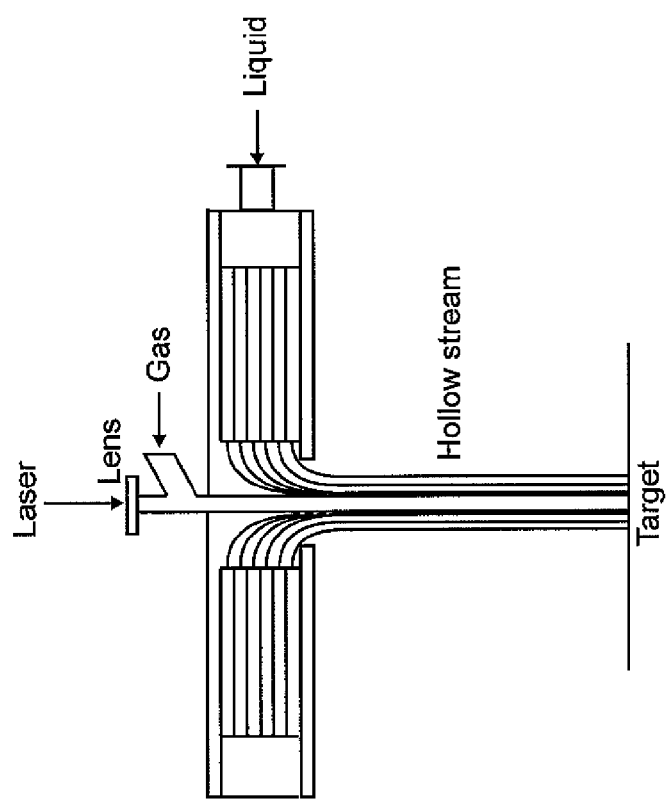
FIG. 13 is a diagram showing the use of a plurality of radial streams to form a hollow stream in accordance with one embodiment of this invention.
Figure 14:
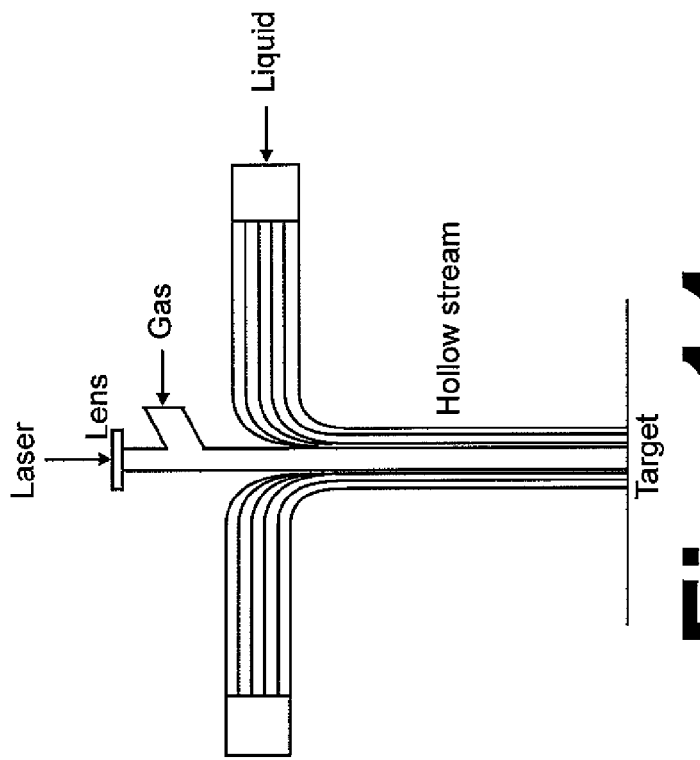
FIG. 14 is a diagram showing the use of a plurality of radial streams in combination with a gaseous fluid to produce a hollow stream in accordance with one embodiment of this invention.

It will be appreciated that there are numerous nozzle designs for creating the light transmissive fluid channels in accordance with the method of this invention. FIG. 10 shows a lateral cross-sectional view of such a nozzle design. As shown therein, a liquid is introduced into a hollow ring annulus 61 from where it flows substantially radially toward the center through relatively thin layers of micro/nano channels, and then exits the tip 62 of the nozzle 60 in a solid or hollow coherent stream 63. Laser energy 14 enters the nozzle head through a sealed lens or a reflector 65 and is focused substantially at the center of the stream proximate the nozzle tip and is carried by the liquid stream as the wave guide in the case of a solid stream, and within the annulus in the case of the hollow stream and is carried to the target within the annulus which forms the wave guide. In a preferred embodiment, a clear fluid, generally a gas, is injected into the annulus to help stabilize the stream and/or to provide additional enhancements of laser target interactions. For example, a gas containing oxygen may be injected to enhance metal cutting, or a fluid with special components may be injected to impart specific characteristics to cutting/spallation.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for transmitting light through a light absorbing medium comprising the steps of:
    providing a column of a first light transmissive fluid in a light absorbing fluid, said column of the first light transmissive fluid contiguous and in direct contact with said light absorbing fluid and without a light containment vessel between the first light transmissive fluid and the light absorbing fluid and having a light inlet end and a light outlet end, wherein said column of first light transmissive fluid is formed by a plurality of parallel fluid streams each having a laminar flow; and
    introducing a light through said light inlet end into said column of first light transmissive fluid, whereby said light is transmitted within said column of first light transmissive fluid through said light absorbing fluid.

2. The method of claim 1, wherein said light absorbing fluid is disposed in a subterranean wellbore.

3. The method of claim 1, wherein a boundary region of said first light transmissive fluid and said light absorbing fluid is a laminar flow region.

4. The method of claim 1, wherein said first light transmissive fluid is a liquid.

5. The method of claim 1, wherein said first column of light transmissive fluid is tapered in a direction of light transmission in said column.

6. The method of claim 1, wherein said column of first light transmissive fluid is tapered in a direction opposite to a transmission direction of said light.

7. The method of claim 1, wherein each of the parallel fluid streams have a diameter less than about 1 µm.

8. The method of claim 1, wherein said column of first light transmissive fluid comprises an inner light transmissive fluid stream disposed within a peripheral annular ring produced by a fluid.

9. The method of claim 8, wherein said fluid is a liquid.

10. The method of claim 1, wherein said light is a laser beam.

11. A method for transmitting light through a light absorbing medium comprising the steps of:
    providing a column of a first light transmissive fluid in a light absorbing fluid, said column of the first light transmissive fluid surrounded by the light absorbing fluid and having a light inlet end and a light outlet end, and wherein said column of first light transmissive fluid is formed by a plurality of parallel fluid streams each having a laminar flow;
    providing a second light transmissive fluid as an annular ring disposed around and in direct contact with said column of first light transmissive fluid and contiguous and in direct contact with said light absorbing fluid and without a light containment vessel between the second light transmissive fluid and the light absorbing fluid, said second light transmissive fluid having a lower refractive index than said first light transmissive fluid, and wherein said annular ring of said second light transmissive fluid is formed by a plurality of parallel fluid streams each having a laminar flow; and
    introducing a light through said light inlet end into said column of first light transmissive fluid, whereby said light is transmitted within said column of first light transmissive fluid through said light absorbing fluid.

12. The method of claim 11, wherein said second light transmissive fluid is a liquid.

13. A method for transmitting light through a light absorbing medium disposed in a subterranean wellbore comprising the steps of:
    providing a light transmissive channel formed by one of a light transmissive liquid and a light transmissive gas through a light absorbing fluid disposed in a subterranean wellbore wherein said light transmissive channel comprises a plurality of parallel fluid streams each having a laminar flow, wherein each of the parallel fluid streams has a diameter less than about 1 µm, said light transmissive channel being contiguous and in direct contact with said light absorbing fluid and without a light containment vessel between the one of the light transmissive liquid and the light transmissive gas and the light absorbing fluid; and
    introducing a light into said light transmissive channel, whereby said light is transmitted within said light transmissive channel through said light absorbing fluid to a desired target area within said subterranean wellbore.

14. The method of claim 13, wherein a boundary region of said light transmissive channel and said light absorbing fluid is a laminar flow region.

15. The method of claim 13, wherein said light transmissive channel is tapered in a direction of light transmission in said channel.

16. The method of claim 13, wherein said light transmissive channel is tapered in a direction opposite to a light transmission direction of said light in said light transmission channel.

17. The method of claim 13, wherein said light is a laser beam.

\* \* \* \* \*